(12) United States Patent
Baum et al.

(10) Patent No.: US 7,101,836 B2
(45) Date of Patent: Sep. 5, 2006

(54) GRAFT POLYMER WITH SIDECHAINS COMPRISING NITROGEN HETEROCYCLES

(75) Inventors: Pia Baum, Frankenthal (DE); Christine Mueller, Ludwigshafen (DE); Anke Oswald, Boehl-Iggelheim (DE); Birgit Potthoff-Karl, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/494,035

(22) PCT Filed: Nov. 11, 2002

(86) PCT No.: PCT/EP02/12555

§ 371 (c)(1),
(2), (4) Date: May 7, 2004

(87) PCT Pub. No.: WO03/042264

PCT Pub. Date: May 22, 2003

(65) Prior Publication Data

US 2004/0266655 A1    Dec. 30, 2004

(30) Foreign Application Priority Data

Nov. 16, 2001    (DE) .................... 101 56 133

(51) Int. Cl.
*C11D 3/37*    (2006.01)

(52) U.S. Cl. ............................ 510/475; 525/404
(58) Field of Classification Search ............... 525/404; 510/475
See application file for complete search history.

(56) References Cited

U.S. PATENT DOCUMENTS

| 4,032,599 A | | 6/1977 | Cordrey et al. | |
| 4,048,301 A | * | 9/1977 | Papantoniou | ............... 510/123 |
| 4,091,030 A | | 5/1978 | Schwartz | |
| 4,904,408 A | * | 2/1990 | Kud et al. | ............... 510/360 |

FOREIGN PATENT DOCUMENTS

| DE | 195 19 339 | | 11/1996 |
| DE | 100 36 713 | | 5/2001 |
| EP | 039 756 | | 11/1981 |
| JP | 2001-106743 | * | 4/2001 |

* cited by examiner

*Primary Examiner*—John R. Hardee
(74) *Attorney, Agent, or Firm*—Oblon, Spivak, McClelland, Maier & Neustadt, P.C.

(57) ABSTRACT

Graft polymer, comprising (A) a polymer graft skeleton with no mono-ethylenic unsaturated units and (B) polymer sidechains formed from co-polymers of two different mono-ethylenic unsaturated monomers (B1) and (B2), each comprising a nitrogen-containing heterocycle, whereby the proportion of the sidechains (B) amounts to more than 55 wt. % of the total polymer.

19 Claims, No Drawings

GRAFT POLYMER WITH SIDECHAINS COMPRISING NITROGEN HETEROCYCLES

The present invention relates to graft polymers containing
(A) a polymeric grafting base devoid of monoethylenically unsaturated units, and
(B) polymeric side chains formed from copolymers of two different monoethylenically unsaturated monomers (B1) and (B2) which each contain at least one nitrogeneous heterocycle,
wherein said side chains (B) account for more than 55% by weight of the total polymer.

This invention further relates to the making of these graft polymers and to their use as dye transfer inhibitors in laundry detergents.

Dyed textiles often shed dye molecules during washing, and these dye molecules then go onto other textiles. This dye transfer is undesirable, and dye transfer inhibitor chemicals are used to counteract it.

DE-A-195 19 339 discloses copolymers of vinylimidazole and N-vinylpyrrolidine which are useful as dye transfer inhibitors.

CA-A-2 227 484 describes block or random copolymers of unsaturated anionic or nonionic monomers, vinylimidazole and N-vinylpyrrolidone as useful ingredients for laundry detergent compositions having a DTI effect.

DE-A-100 36 713 claims dye transfer inhibitors which are based on graft polymers having polyethylene glycol as a grafting base and vinylimidazole and N-vinylpyrrolidone as a graft component and in which the weight ratio of graft component to grafting base is in the range from 0.1 to 1.2:1. However, what is explicitly disclosed is only a graft polymer in which the graft component fraction is 20% by weight.

Known dye transfer inhibitors have a number of disadvantages. First, their performance is often not good enough and, what is more, highly dependent on the composition of the laundry detergent. Secondly, they are not compatible with all customary laundry detergent components, so that the laundry detergent composition is subject to severe constraints, which is problematical in the case of liquid detergents in particular.

It is an object of the present invention to remedy these defects and provide dye transfer inhibitors having advantageous application properties.

We have found that this object is achieved by graft polymers containing
(A) a polymeric grafting base devoid of monoethylenically unsaturated units, and
(B) polymeric side chains formed from copolymers of two different monoethylenically unsaturated monomers (B1) and (B2) which each contain at least one nitrogeneous heterocycle,
wherein said side chains (B) account for more than 55% by weight of the total polymer.

Preferred graft polymers are disclosed in subsidiary claims.

The present invention further provides a process for preparing the graft polymers, which comprises free-radically polymerizing the monomers (B1) and (B2) in the presence of the grafting base (A).

Lastly the present invention provides for the use of the graft polymers as dye transfer inhibitors in laundry detergents.

The graft polymers of the invention, which have a comb-like construction, are characterized by an optimum ratio of side chains (B) to backbone (grafting base (A)). This ratio is optimum when the fraction of the side chains (B) accounts for more than 55% by weight of the graft polymers. It is only then that side chain density and length are sufficient. The fraction is preferably in the range from 60 to 95% by weight, more preferably in the range from 70 to 95% by weight and most preferably in the range from 70 to 90% by weight.

Monomer (B1) in the side chains (B) of the graft polymers according to the invention is preferably a cyclic N-vinylamide of the general formula I

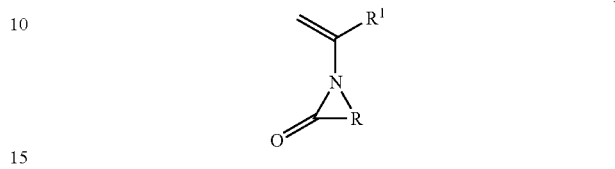

where
R is $C_1$–$C_5$-alkyl and
$R^1$ is hydrogen or $C_1$–$C_4$-alkyl.

Specific examples of monomers useful as monomer (B1) are N-vinylpyrrolidone, N-vinylvalerolactam and N-vinylcaprolactam, of which N-vinylpyrrolidone is preferred.

The side chains (B) preferably further contain units derived from a monoethylenically unsaturated comonomer (B2) which contains a nitrogenous heterocycle selected from the group consisting of the pyrroles, pyrrolidines, pyridines, quinolines, isoquinolines, purines, pyrazoles, imidazoles, triazoles, tetrazoles, indolizines, pyridazines, pyrimidines, pyrazines, indoles, isoindoles, oxazoles, oxazolidones, oxazolidines, morpholines, piperazines, piperidines, isoxazoles, thiazoles, isothiazoles, indoxyls, isatins, dioxindoles and hydantoins and derivatives thereof, for example barbituric acid and uracil and derivatives thereof.

Preferred heterocycles are imidazoles, pyridines and pyridine N-oxides, of which imidazoles are particularly preferred.

Examples of particularly suitable comonomers (B2) are N-vinylimidazoles, alkylvinylimidazoles, especially methylvinylimidazoles such as 1-vinyl-2-methylimidazole, 3-vinylimidazole N-oxide, 2- and 4-vinylpyridines, 2- and 4-vinylpyridine N-oxides and also betainic derivatives and quaternization products thereof.

Very particularly preferred comonomers (B2) are N-vinylimidazoles of the general formula IIa, betainic N-vinylimidazoles of the general formula IIb, 2- and 4-vinylpyridines of the general formulae IIc and IId and also betainic 2- and 4-vinylpyridines of the general formulae IIe and IIf

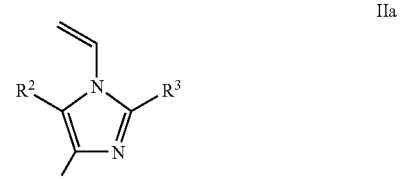

IIa

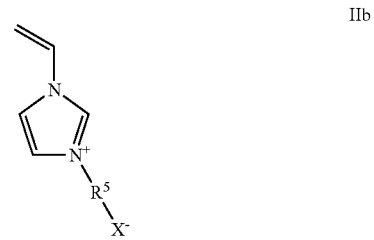

IIb

-continued

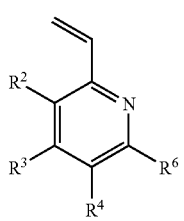
IIc

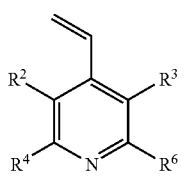
IId

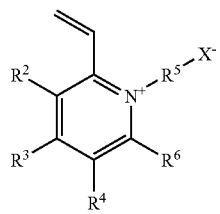
IIe

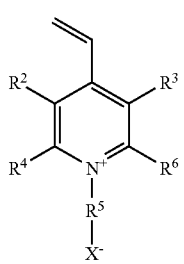
IIf where $R^2$, $R^3$, $R^4$ and $R^6$ are each independently hydrogen, $C_1$–$C_4$-alkyl or phenyl, preferably hydrogen;
$R^5$ is $C_1$–$C_{20}$-alkylene, preferably $C_1$–$C_2$-alkylene;
$X^-$ is $-SO_3^-$, $-OSO_3^-$, $-COO^-$, $-OPO(OH)O^-$, $-OPO(OR')O^-$ or $-PO(OH)O^-$;

R' is $C_1$–$C_6$-alkyl.

Examples of especially preferred betainic comonomers (B2) are unsubstituted monomers of the formulae IIb, IIe and IIf where the $R^5$—$X^-$ moiety is $-CH_2-COO^-$ or $-C_2H_4-SO_3^-$.

It will be appreciated that vinylimidazoles and vinylpyridines quaternized before or after polymerization are likewise suitable for use as comonomers (B2).

The quaternization can be effected in particular with alkylating agents such as alkyl halides, which generally have from 1 to 24 carbon atoms in the alkyl moiety, or dialkyl sulfates, which generally contain alkyl moieties of from 1 to 10 carbon atoms. Examples of suitable alkylating agents from these groups are methyl chloride, methyl bromide, methyl iodide, ethyl chloride, ethyl bromide, propyl chloride, hexyl chloride, dodecyl chloride and lauryl chloride on the one hand and dimethyl sulfate and diethyl sulfate on the other. Suitable alkylating agents further include for example benzyl halides, especially benzyl chloride and benzyl bromide; chloroacetic acid; methyl fluorosulfate; diazomethane; oxonium compounds, such as trimethyloxonium tetrafluoroborate; alkylene oxides, such as ethylene oxide, propylene oxide and glycidol, which are used in the presence of acids; cationic epichlorohydrins. Preferred quaternizing agents are methyl chloride, dimethyl sulfate and diethyl sulfate.

Examples of particularly suitable quaternized comonomers (B2) are 1-methyl-3-vinylimidazolium methosulfate and 1-methyl-3-vinylimidazolium methochloride.

The weight ratio of the monomers (B1) and (B2) is generally in the range from 99:1 to 1:99, preferably in the range from 90:10 to 30:70, more preferably in the range from 90:10 to 50:50, most preferably in the range from 80:20 to 50:50 and especially in the range from 80:20 to 60:40.

The polymeric grafting base (A) of the graft polymers according to the invention is preferably formed by a polyether. The term "polymeric" as used herein shall also comprehend oligomeric compounds.

The polyethers (A) preferably have an average molecular weight $M_n$ of at least 300 and the general formula IIIa.

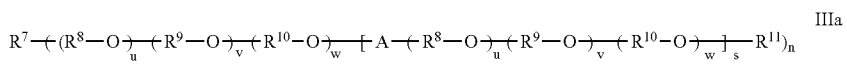
IIIa or IIIb

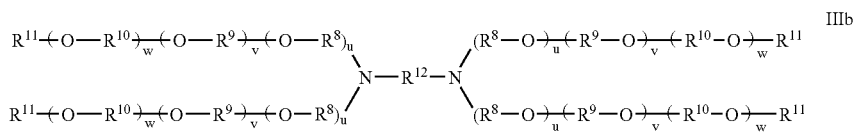
IIIb where:

$R^7$ is hydroxyl, amino, $C_1$–$C_{24}$-alkoxy, $R^{13}$—COO—, $R^{13}$—NH—COO— or a polyalcohol radical, $R^8$ $R^9$ and $R^{10}$ which may be the same or different, are each —$(CH_2)_2$—, —$(CH_2)_3$—, —$(CH_2)_4$—, —$CH_2$—CH($CH_3$)—, —$CH_2$—CH($CH_2$—$CH_3$)— or —$CH_2$—CHOR$^{14}$—$CH_2$—, $R^{11}$ is hydrogen, amino-$C_1$–$C_6$-alkyl, $C_1$–$C_{24}$-alkyl, $R^{13}$—CO— or $R^{13}$—NH—CO—, $R^{12}$ is $C_1$–$C_{20}$-alkylene whose carbon chain may be interrupted by from 1 to 10 oxygen atoms in ether function, $R^{13}$ is $C_1$–$C_{24}$-alkyl, $R^{14}$ is hydrogen, $C_1$–$C_{24}$-alkyl or $R^{13}$—CO—, A is —CO—O—, —CO—B—CO—O— or —CO—NH—B—NH—CO—O—;

B is —$(CH_2)_t$— or substituted or unsubstituted arylene, n is 1 or, when $R^7$ is a polyalcohol radical, is from 1 to 8, s is from 0 to 500;

t is from 1 to 12;

each u, which may be the same or different, is from 1 to 5000, each v, which may be the same or different, is from 0 to 5000, and each w, which may be the same or different, is from 0 to 5000.

The polyethers of the formula IIIa are a preferred grafting base (A).

The grafting base (A) comprises polyethers from the group of the polyalkylene oxides based on ethylene oxide, propylene oxide and butylene oxides, polytetrahydrofuran and also polyglycerol. Depending on the nature of the monomeric building blocks, the resulting polymers will contain the following structural units:

—$(CH_2)_2$—O—, —$(CH_2)_3$—O—, —$(CH_2)_4$—O—, —$CH_2$—CH($CH_3$)—O—, —$CH_2$—CH($CH_2$—$CH_3$)—O—, —$CH_2$—CHOR$^8$—$CH_2$—O—

Also suitable are not only homopolymers but also copolymers, and copolymers can have a random distribution or be block polymers.

The terminal primary hydroxyl groups of the polyethers prepared on the basis of alkylene oxides or glycerol and also the secondary OH groups of polyglycerol can be free or etherified with $C_1$–$C_{24}$ alcohols, esterified with $C_1$–$C_{24}$ carboxylic acids or urethanized with isocyanates. Useful alcohols for this purpose include for example primary aliphatic alcohols, such as methanol, ethanol, propanol, and butanol, primary aromatic alcohols, such as phenol, isopropylphenol, tert-butylphenol, octylphenol, nonylphenol and naphthol, secondary aliphatic alcohols, such as isopropanol, tertiary aliphatic alcohols, such as tert-butanol, and polyhydric alcohols, for example diols, such as ethylene glycol, diethylene glycol, propylene glycol, 1,3-propanediol and butanediol, and triols, such as glycerol and trimethylolpropane. However, the hydroxyl groups may also be exchanged for primary amino groups by reductive amination with hydrogen-ammonia mixtures under superatmospheric pressure or have been converted into aminopropylene end groups by cyanoethylation with acrylonitrile and hydrogenation. The hydroxyl end groups may be capped or tipped subsequently by reaction with alcohols or with alkali metal hydroxide solutions, amines and hydroxylamines, but these compounds, like Lewis acids, for example boron trifluoride, can also be used as starters at the start of the polymerization. Finally, the hydroxyl groups can also be capped or tipped by reaction with alkylating agents, such as dimethyl sulfate.

The alkyl radicals in the formulae IIIa and IIIb can be branched or unbranched $C_1$–$C_{24}$-alkyl radicals, of which $C_1$–$C_{12}$-alkyl radicals are preferred and $C_1$–$C_6$-alkyl radicals are particularly preferred. Examples are methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, 2-ethylhexyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl and n-eicosyl.

The average molecular weight $M_n$ of the polyethers (A) is at least 300 and is generally $\leq 100\,000$. It is preferably in the range from 500 to 50 000, more preferably in the range from 500 to 10 000 and most preferably in the range from 500 to 2 000.

It is advantageous to use homo- and copolymers of ethyleneoxide, propylene oxide, butylene oxide and isobutylene oxide, which can be linear or branched, as grafting base (A). The term homopolymers as used herein shall for the purposes of the invention also comprehend those polymers which, as well as the polymerized alkylene oxide unit, additionally contain reactive molecules which were used for initiating the polymerization of the cyclic ethers or for end group capping of the polymer.

Branched polymers can be prepared by for example adding to low molecular weight polyalcohols ($R^7$ radicals in the formulae IIIa and IIIb), for example pentaerythritol, glycerol and sugars or sugar alcohols, such as sucrose, D-sorbitol and D-mannitol, disaccharides, ethylene oxide and, if desired, propylene oxide and/or butylene oxides or else polyglycerol.

In the polymers formed, at least one, preferably from one to eight and more preferably from one to five of the hydroxyl groups present in the polyalcohol molecule can be linked in the form of an ether bond to the polyether radical of the formula IIIa or IIIb.

Four-arm polymers are obtainable by adding the alkylene oxides to diamines, preferably ethylenediamine.

Further branched polymers are preparable by reacting alkylene oxides with higher amines, for example triamines, or especially polyethyleneimines. Suitable polyethyleneimines for this generally have average molecular weights $M_n$ in the range from 300 to 20 000, preferably in the range from 500 to 10 000 and more preferably in the range from 500 to 5 000. The weight ratio of alkylene oxide to polyethyleneimine is customarily in the range from 100:1 to 0.1:1, and preferably in the range from 20:1 to 0.5:1.

However, it is also possible to use polyesters of polyalkylene oxides and aliphatic $C_1$–$C_{12}$-, preferably $C_1$–$C_6$-, dicarboxylic acids or aromatic dicarboxylic acids, for example oxalic acid, succinic acid, adipic acid or terephthalic acid, having average molecular weights of from 1 500 to 25 000 as grafting base (A).

It is further possible to use phosgenation-prepared polycarbonates of polyalkylene oxides or else polyurethanes of polyalkylene oxides and aliphatic $C_1$–$C_{12}$-diisocyanates and preferably $C_1$–$C_6$-diisocyanates or aromatic diisocyanates, for example hexamethylene diisocyanate or phenylene diisocyanate, as grafting base (A).

These polyesters, polycarbonates or polyurethanes can contain up to 500, preferably up to 100 polyalkylene oxide units, in which case polyalkylene oxide units can consist not only of homopolymers but also of copolymers of different alkylene oxides.

Grafting base (A) is particularly preferably selected from homo- and copolymers of ethylene oxide and/or propylene oxide, which can be singly or doubly end group capped or tipped.

The particular advantage of polypropylene oxide and copolymeric alkylene oxides having a high propylene oxide fraction is that grafting takes place easily.

The particular advantage of polyethylene oxide and copolymeric alkylene oxides with a high ethylene oxide fraction is that, after grafting has taken place and has produced a graft polymer having the same graft density as polypropylene oxide, the weight ratio of side chain to grafting base is larger.

The K values of the graft polymers according to the invention are customarily in the range from 10 to 150, preferably in the range from 10 to 80 and more preferably in the range from 15 to 60 (determined after H. Fikentscher, Cellulose-Chemie, Volume 13, pages 58 to 64 and 71 to 74 (1932) in water or aqueous sodium chloride solutions at 25° C. and polymer concentrations ranging from 0.1% by weight to 5% by weight, depending on the K value range). The particular K value desired can be set in a conventional manner through the composition of the starting materials.

The invention likewise provides a process for preparing the graft polymers, which comprises free-radically polymerizing the monomers (B1) and (B2) in the presence of the grafting base (A).

The polymerization can be carried out for example in solution polymerization, bulk polymerization, as an emulsion polymerization, as an inverse emulsion polymerization, as a suspension polymerization, as an inverse suspension polymerization or as a precipitation polymerization. Preference is given to bulk polymerization and especially solution polymerization, which is carried out in the presence of water in particular.

A bulk polymerization can be carried out by dissolving the monomers (B1) and (B2) in the grafting base (A), heating the mixture to the polymerization temperature and adding a free-radical initiator before polymerizing the mixture to completion. The polymerization can also be carried out semicontinuously by initially charging a portion, for example 10% by weight, of the mixture of grafting base (A), monomer (B1), monomer (B2) and free-radical initiator and heating the mixture to the polymerization temperature and, after the polymerization has lighted off, to add the rest of the mixture to be polymerized at a rate commensurate with the progress of the polymerization. However, it is also possible to initially charge the grafting base (A) to a reactor, to heat the initial charge to polymerization temperature and to add monomers (B1) and (B2) separately or as a mixture and the free-radical initiator either all at once, batchwise or preferably continuously before polymerizing.

It will be appreciated that the above-described graft polymerization can also be carried out in a solvent. Suitable organic solvents are for example aliphatic and cycloaliphatic monohydric alcohols, such as methanol, ethanol, n-propanol, isopropanol, n-butanol, sec-butanol, tert-butanol, n-hexanol and cyclohexanol, polyhydric alcohols, for example glycols, such as ethylene glycol, propylene glycol and butylene glycol, and glycerol, alkyl ethers of polyhydric alcohols, for example methyl and ethyl ethers of the dihydric alcohols mentioned, and also ethyl alcohols, such as diethylene glycol and triethylene glycol, and also cyclic ethers, such as dioxane.

According to the invention, the graft polymerization is preferably carried out in water as a solvent. The components (A), (B1) and (B2) are more or less effectively dissolved, depending on the amount of water used. The water, in part or in whole, can also be added in the course of the polymerization. It will be appreciated that it is also possible to use mixtures of water and the abovementioned organic solvents.

It is customary to use from 5 to 250% by weight and preferably from 10 to 150% by weight of organic solvent, water or mixture of water and organic solvent, based on the graft polymer.

The polymerization in water generally provides 10–70% by weight and preferably 20–50% by weight solutions or dispersions of the graft polymers according to the invention, which if desired can be converted into powder form by means of various drying processes, for example spray drying, fluidized spray drying, drum drying or freeze drying. An aqueous solution or dispersion can then easily be reestablished by adding water at the desired time.

Useful free-radical initiators are in particular peroxo compounds, azo compounds, redox initiator systems and reducing compounds. It will be appreciated that it is also possible to use mixtures of free-radical initiators.

Examples of suitable free-radical initiators are specifically alkalimetalperoxodisulfates, for example sodium peroxodisulfate, ammonium peroxodisulfate, hydrogen peroxide, organic peroxides, such as diacetal peroxide, di-tert-butyl peroxide, diamyl peroxide, dioctanoyl peroxide, didecanoyl peroxide, dilauroyl peroxide, dibenzoyl peroxide, bis(o-tolyl) peroxide, succinyl peroxide, tert-butyl peracetate, tert-butyl permaleate, tert-butyl perisobutyrate, tert-butyl perpivalate, tert-butyl peroctoate, tert-butyl perneodecanoate, tert-butyl perbenzoate, tert-butyl peroxide, tert-butyl hydroperoxide, cumene hydroperoxide, tert-butyl peroxi-2-ethylhexanoate and diisopropyl peroxidicarbamate; azobisisobutyronitrile, azobis(2-amidopropane) dihydrochloride and 2,2'-azobis(2-methylbutyronitrile); sodium sulfite, sodium bisulfite, sodium formaldehydesulfoxylate and hydrazine and combinations thereof with hydrogen peroxide; ascorbic acid/iron(II) sulfate/sodium peroxodisulfate, tert-butyl hydroperoxide/sodium disulfite and tert-butyl hydroperoxide/sodium hydroxymethanesulfinate.

Preferred free-radical initiators are for example tert-butyl perpivalate, tert-butyl peroctoate, tert-butyl perneodecanoate, tert-butyl peroxide, tert-butyl hydroperoxide, azobis(2-methylpropionamidine) dihydrochloride, 2,2'-azobis (2-methylbutyronitrile), hydrogen peroxide and sodium eroxodisulfate, to which redox metal salts, for example iron salts, can be added in small amounts.

It is customary to use from 0.01 to 10% by weight and preferably from 0.1 to 5% by weight of free-radical initiator, based on the onomers (B1) and (B2).

If desired, it is also possible to use polymerization regulators. Useful compounds are known to one skilled in the art and include for example sulfur compounds, such as mercaptoethanol, 2-ethylhexyl thioglycolate, thioglycolic acid and dodecyl mercaptan. When polymerization regulators are used, their use level is generally in the range from 0.1 to 15% by weight, preferably in the range from 0.1 to 5% by weight and more preferably in the range from 0.1 to 2.5% by weight, based on monomers (B1) and (B2).

The polymerization temperature is generally in the range from 30 to 200° C., preferably in the range from 50 to 150° C. and more preferably in the range from 75 to 110° C.

The polymerization is customarily carried out under atmospheric pressure, but can also take place under reduced or elevated pressure, for example at 1 and 5 bar.

The graft polymers according to the invention are very useful as dye transfer inhibitors in the washing of colored textiles. They are not only effective in inhibiting dye transfer, but are also universally usable and incorporable in a wide range of laundry detergents and compatible with the customary laundry detergent components.

The graft polymers according to the invention are generally used in amounts from 0.05 to 5% by weight and preferably from 0.1 to 2% by weight in laundry detergent formulations. They are suitable not only for heavy duty detergents but also for specialty detergents, such as color detergents. In color detergents, which are benign to colors, they are customarily used in amounts from 0.1 to 1.5% by weight and preferably from 0.2 to 1% by weight.

The laundry detergents can be pulverulent or be present as a liquid brand. They contain the customarily used anionic and/or nonionic surfactants in amounts of from 2 to 50% by weight and preferably from 8 to 30% by weight. Particular preference is given to producing phosphate-free or reduced-phosphate laundry detergents, which contain a phosphate content of not more than 25% by weight, reckoned as pentasodium triphosphate. The laundry detergents can also be present in granular form or as compacts, which have a density in the range from 500 to 950 g/l.

Suitable anionic surfactants are for example $C_8$–$C_{22}$- and preferably $C_{10}$–$C_{18}$-fatty alcohol sulfates, for example $C_9$/$C_{11}$-alcohol sulfates, $C_{12}$/$C_{13}$-alcohol sulfates, cetyl sulfate, myristyl sulfate, palmityl sulfate, stearyl sulfate and tallow fatty alcohol sulfate.

Further suitable anionic surfactants are sulfated alkoxylated $C_8$–$C_{22}$- and preferably $C_{10}$–$C_{18}$-alcohols and soluble salts thereof. Compounds of this kind are prepared for example by initially alkoxylating the alcohol and then sulfating the alkoxylation product. The alkoxylation is preferably carried out using ethylene oxide in an amount from 2 to 50 mol and especially from 3 to 20 mol per mole of fatty alcohol. However, the alkoxylation can also be carried out with propylene oxide or with butylene oxide. It will be appreciated that the alkylene oxides can also be used in combination. In that case, the alkoxylated alcohols can contain the ethylene oxide, propylene oxide and/or butylene oxide units in the form of blocks or in random distribution.

Suitable anionic surfactants further include alkylsulfonates, especially $C_8$–$C_{24}$- and particularly $C_{10}$–$C_{18}$-alkylsulfonates, and also soaps, for example the salts of aliphatic $C_8$–$C_{24}$-carboxylic acids.

Further suitable anionic surfactants are linear $C_9$–$C_{20}$-alkylbenzenesulfonates (LASs). Their use level can generally be up to 8% by weight.

The anionic surfactants are preferably added to the laundry detergent in the form of salts. Suitable cations are alkali metal ions, such as sodium, potassium and lithium ions, and ammonium ions, for example hydroxyethylammonium, di(hydroxyethyl)ammonium and tri(hydroxyethyl)ammonium ions.

Examples of suitable nonionic surfactants are alkoxylated $C_8$–$C_{22}$- and especially $C_{10}$–$C_{18}$-alcohols. The alkoxylation can be carried out with ethylene oxide, propylene oxide and/or butylene oxide. The alkoxylated alcohols can then contain the alkylene oxide units in the form of blocks or in random distribution. At least one of these alkylene oxides is used in an amount from 2 to 5 and preferably from 3 to 20 mol per mole of alcohol. The preferred alkylene oxide is ethylene oxide.

Suitable nonionic surfactants further include $C_8$–$C_{22}$- and especially $C_{10}$–$C_{18}$-alkylpolyglucosides. These compounds contain from 1 to 20 and preferably from 1.1 to 5 glucoside units.

A further class of suitable nonionic surfactants comprises N-alkylglucamides of the structures

where D is $C_6$–$C_{22}$-alkyl, preferably $C_{10}$–$C_{18}$-alkyl, E is hydrogen or $C_1$–$C_4$-alkyl, preferably methyl, and G is polyhydroxy-$C_5$–$C_{12}$-alkyl having at least 3 hydroxyl groups, preferably polyhydroxy-$C_5$–$C_6$-alkyl. Compounds of this type are obtained, for example, by acylation of reductively aminated sugars with acyl chlorides of $C_{10}$–$C_{18}$-carboxylic acids.

The nonionic surfactants in the laundry detergent formulations are preferably ethoxylation products of from 3 to 12 mol of ethylene oxide with $C_{10}$–$C_{16}$-alcohols, especially fatty alcohols.

The pulverulent and granular laundry detergents and optionally also structured liquid laundry detergents further include one or more inorganic builders.

Useful inorganic builders include for example all customary compounds, such as aluminosilicates, silicates, carbonates and phosphates.

Examples include specifically aluminosilicates having iron-exchanging properties, such as zeolites, for example zeolite A, X, B, P, MAP and HS in their sodium form and in forms in which sodium has been partly exchanged for other cations, such as lithium, potassium, calcium, magnesium or ammonium.

Useful silicates include for example amorphous and crystalline silicates, such as amorphous disilicates, crystalline disilicates, for example SKS-6 sheet-silicate from Clariant AG. The silicates can be used in the form of their alkali metal, alkaline earth metal or ammonium salts. Preference is given to using sodium, lithium and magnesium silicates.

Carbonates and bicarbonates useful as inorganic builders can likewise be used in the form of their alkali metal, alkaline earth metal and ammonium salts. Preference is given to sodium, lithium and magnesium carbonates and bicarbonates, and particular preference is given to sodium carbonate and/or sodium bicarbonate. Sodium triphosphate in particular may be mentioned as a suitable phosphate.

The inorganic builders can be present in the laundry detergents in amounts from 5 to 60% by weight. They can be incorporated into the laundry detergent, either alone or in any desired combination with each other. In pulverulent and granular laundry detergents they are incorporated in amounts from 10 to 60% by weight and preferably from 20 to 50% by weight. In structured (multiphase) liquid laundry detergents, inorganic builders are incorporated in amounts of up to 40% by weight and preferably up to 20% by weight. For this purpose, they are suspended in the liquid formulation ingredients.

The laundry detergents additionally include, as well as the inorganic builders, one or more low molecular weight polycarboxylates as organic cobuilders.

Suitable polycarboxylates include for example:
(1) Polymaleic acids obtainable by polymerization of maleic anhydride in aromatic hydrocarbons in the presence of free-radical initiators and subsequent hydrolysis of the anhydride groups of the polymer. The average molecular weight $M_w$ of these polymaleic acids are preferably in the range from 800 to 5 000.

(2) Copolymers of unsaturated $C_4$–$C_8$-dicarboxylic acids, such as maleic acid, fumaric acid, itaconic acid and citraconic acid, preferably maleic acid, useful comonomers being (i) monoethylenically unsaturated $C_3$–$C_8$-monocarboxylic acids, such as acrylic acid, methacrylic acid, crotonic acid and vinylacetic acid, preferably acrylic acid and methacrylic acid, (ii) $C_2$–$C_{22}$-monoolefins, vinyl $C_1$–$C_8$-alkyl ethers, styrene, vinyl esters of $C_1$–$C_8$-carboxylic acids, (meth)acrylamide and vinylpyrrolidone, preferably $C_2$–$C_6$-α-olefins, vinyl $C_1$–$C_4$-alykl ethers, vinyl acetate and vinyl propionate, hydroxyalkyl acrylates, such as hydroxyethyl acrylate, hydroxy-n-propyl acrylate, hydroxy-n-butyl acrylate, hydroxyisobutyl acrylate, hydroxyethyl methacrylate, hydroxypropyl methacrylate and hydroxyisopropyl acrylate, (iii) (meth)acrylic esters of monohydric $C_1$–$C_8$-alcohols, (meth)acrylonitrile, (meth)acrylamides of $C_1$–$C_8$-alkylamines, N-vinylformamide and N-vinylimidazole.

The copolymers can contain units derived from the monomers of group (i) in amounts up to 95% by weight, derived from monomers (ii) in amounts of up to 60% by weight and derived from monomers (iii) in amounts of up to 20% by weight.

The copolymers can contain units derived from 2, 3, 4 or optionally even 5 different monomers.

When the copolymers of group (ii) contain units derived from vinyl ester and vinylformamide monomers, these units may also be partially or completely hydrolyzed to form respectively vinyl alcohol and vinylamine units.

Preferred copolymers of dicarboxylic acids are:

copolymers of maleic acid and acrylic acid in a weight ratio of from 10:90 to 95:5, and particularly preferably from 30:70 to 90:10 and having average molecular weights $M_w$ especially up to 10 000, in particular from 1 000 to 6 000, terpolymers of maleic acid, acrylic acid and a vinyl ester of a $C_1$–$C_3$-carboxylic acid in a weight ratio of from 10 (maleic acid): 90 (acrylic acid+vinyl ester) to 95:10, the weight ratio of acrylic acid to vinyl ester being in the range from 20:80 to 80:20, especially terpolymers of maleic acid, acrylic acid and vinyl formate, vinyl acetate or vinyl propionate in a weight ratio of from 20 (maleic acid): 80 (acrylic acid+vinyl ester) to 90:10, the weight ratio of acrylic acid to vinyl ester being in the range from 30:70 to 70:30, having average molecular weights $M_w$ especially up to 10 000, in particular from 1 000 to 7 000, copolymers of maleic acid with $C_2$–$C_8$-α-olefins, preferably ethylene, propylene, isobutene and diisobutene, in a molar ratio of from 40:60 to 80:20, preferably 50:50, having average molecular weights $M_w$ especially of from 1 000 to 7 000.

(3) Graft polymers of unsaturated carboxylic acids on low molecular weight carbohydrates or hydrogenated carbohydrates.

Suitable unsaturated carboxylic acids are for example maleic acid, fumaric acid, itaconic acid, citraconic acid, acrylic acid, methacrylic acid, crotonic acid and vinylacetic acid and also mixtures of acrylic and maleic acid, which are grafted onto the grafting base in amounts from 40 to 95% by weight for example. For modification, it is additionally possible for up to 30% by weight, based on the component to be grafted, of further monoethylenically unsaturated monomers to be present in copolymerized form. Suitable modifying monomers are the abovementioned monomers of groups (ii) and (iii) and also acrylamido-2-methylpropanesulfonic acid and sodium vinylsulfonate.

Suitable grafting bases include degraded polysaccharides, for example acidic or enzymatically degraded starches, inulins or cellulose, reduced (hydrogenated or reductively aminated) degraded polysaccharides, for example mannitol, sorbitol, aminosorbitol and glucamine, sugars, for example glucose, and also polyalkylene glycols having average molecular weights $M_w$ of up to 5 000, for example polyethylene, glycols, ethylene oxide-propylene oxide block copolymers, ethylene oxide-butylene oxide block copolymers, random ethylene oxide-propylene oxide copolymers and random ethylene oxide-butylene oxide copolymers, and alkoxylated mono- and polyhydric $C_1$–$C_{22}$-alcohols.

Preference among this group is given to grafted degraded or reduced starches and grafted polyethylene oxides, the amount of monomer used in the graft polymerization being in the range from 20 to 80% by weight, based on the graft component. Grafting is preferably performed using a mixture of maleic acid and acrylic acid in the ratio of from 90:10 to 10:90. The average molecular weights $M_w$ of these graft polymers are preferably up to 10 000 and especially in the range from 1 000 to 7 000.

(4) Polyglyoxylic acids having differently structured end groups and average molecular weights $M_w$ of up 10 000, especially from 1 000 to 7 000.

(5) Polyamidocarboxylic acids and modified polyamidocarboxylic acids.

Preference is given to using polyaspartic acids and cocondensates of aspartic acid with further amino acids, $C_4$–$C_{25}$-monocarboxylic and -dicarboxylic acids or $C_4$–$C_{25}$-monoamines and -diamines. Particular preference is given to using polyaspartic acids prepared in phosphorus-containing acids and modified with $C_6$–$C_{22}$-mono- or -dicarboxylic acids or with $C_6$–$C_{22}$-mono- or -diamines. Very particular preference is given to those modified polyaspartic acids which are obtainable by condensation of aspartic acid with from 5 to 25 mol %, based on aspartic acid, of tridecylamine or oleylamine and at least 5% by weight, based on aspartic acid, of phosphoric acid or phosphorous acid at from 150 to 230° C. and hydrolysis and neutralization of the cocondensates. The average molecular weights $M_w$ of these polycondensates are preferably up to 10 000 and especially in the range from 1 000 to 7 000.

(6) Condensation products of citric acid with hydroxycarboxylic acids or polyhydroxy compounds having average molecular weights $M_w$ of up to 10 000 and preferably up to 5 000.

The organic cobuilders are present in the pulverulent and granular and also in the structured liquid laundry detergent formulations in amounts from 0.5 to 15% by weight and preferably from 1 to 8% by weight. They are present in liquid laundry detergent formulations in amounts from 0.5 to 20% by weight, preferably from 1 to 10% by weight and particularly preferably from 1.5 to 7.5% by weight.

The pulverulent and granular heavy duty laundry detergents additionally include a bleaching system comprising at least one bleaching agent with or without a bleach activator and/or a bleach catalyst. Suitable bleaching agents are perborates and percarbonates in the form of their alkali metal salts, especially their sodium salts. They are present in the formulations in amounts from 5 to 30% by weight and preferably from 10 to 25% by weight.

Further suitable bleaching agents are inorganic and organic peracids in the form of their alkali metal or magnesium salts or partly also in the form of the free acids. Examples of suitable organic percarboxylic acids and salts thereof are magnesium monoperphthalate, phthalimidopercaproic acid and dodecane-1,10-diperacid. An example of an inorganic peracid salt is potassium peroxomonosulfate (Oxone).

Suitable bleach activators are for example:
acylamines, such as tetraacetylethylenediamine, tetraacetylglycoluril, N,N'-diacetyl-N,N'-dimethylurea and 1,5-diacetyl-2,4-dioxohexahydro-1,3,5-triazine,
acylated lactams, such as acetylcaprolactam, octanoylcaprolactam and benzoylcaprolactam,
substituted phenol esters of carboxylic acids, such as sodium acetoxybenzenesulfonate, sodium octanoyloxybenzenesulfonate and sodium nonanoyloxybenzenesulfonate,
acylated sugars, such as pentaacetylglucose,
anthranil derivatives, such as 2-methylanthranil and 2-phenylanthranil,
enol esters, such as isopropenyl acetate,
oxime esters, such as O-acetylacetone oxime,
carboxylic anhydrides, such as phthalic anhydride and acetic anhydride.

Preference is given to using tetraacetylethylenediamine and sodium nonanoyloxybenzenesulfonates as bleach activators.

Bleach activators are included in heavy duty laundry detergents in amounts from 0.1 to 15% by weight, preferably in amounts from 1 to 8% by weight and more preferably in amounts from 1.5 to 6% by weight.

Suitable bleach catalysts are quaternized imines and sulfonimines and manganese complexes. When bleach catalysts are used in the laundry detergent formulations, they are included in amounts of up to 1.5% by weight and preferably up to 0.5% by weight and in the case of the very active manganese complexes in amounts of up to 0.1% by weight.

The laundry detergents preferably include an enzyme system. Customary enzymes are proteases, lipases, amylases or cellulases. Enzyme system can be limited to a single enzyme or comprise a combination of different enzymes. Laundry detergents include commercially available enzymes generally in amounts from 0.1 to 1.5% by weight and preferably from 0.2 to 1% by weight of the commercial form. Suitable proteases are for example Savinase and Esperase (from Novo Nordisk), a suitable lipase is for example Lipolase (from Novo Nordisk) and a suitable cellulase is for example Celluzym (again from Novo Nordisk).

The laundry detergents preferably include soil release polymers and/or soil antiredeposition agents. These are for example polyesters of an alcohol component comprising polyethylene oxides singly tipped with dihydric and/or higher alcohols, especially ethylene glycol and/or propylene glycol, and an acid component comprising aromatic dicarboxylic acids or aromatic and aliphatic dicarboxylic acids.

Useful soil release polymers further include amphiphilic graft and copolymers of vinyl and/or acrylic esters on or with polyalkylene oxides and modified celluloses, for example methylcellulose, hydroxypropylcellulose and carboxymethylcellulose.

Soil release polymers which are preferably used are graft polymers of vinyl acetate on polyethylene oxide of average molecular weight $M_w$ 2 500–8 000 in a weight ratio from 1.2:1 to 3:1 and also commercially available polyethylene terephthalate-polyoxyethylene terephthalates of an average molecular weight $M_w$ of from 3 000 to 25 000 formed from polyethylene oxides having an average molecular weight $M_w$ of from 750 to 5 000 with terephthalic acid and ethylene oxide and a molar ratio of polyethylene terephthalate to polyoxyethylene terephthalate of from 8:1 to 1:1 and block polycondensates containing blocks of (a) ester units of polyalkylene glycols having an average molecular weight $M_w$ of from 500 to 7 500 and aliphatic dicarboxylic acids and/or monohydroxymonocarboxylic acids and (b) ester units of aromatic dicarboxylic acids and polyhydric alcohols. These amphiphilic block polymers have average molecular weights $M_w$ of from 1 500 to 25 000.

Soil antideposition agents and soil release polymers are included in the laundry detergent formulations in amounts from 0 to 2.5% by weight, preferably from 0.2 to 1.5% by weight and more preferably from 0.3 to 1.2% by weight.

EXAMPLES

I) Preparation of Graft Polymers According to Invention

The K values reported in the examples were determined by the method of H. Fikentscher, Cellulose-Chemie, Volume 13, 58–64, 71–74 (1932), at 25° C. in 1% by weight aqueous solution, unless otherwise stated.

Example 1

In a reactor equipped with nitrogen supply, reflux condenser, stirrer and metering means, 80 g of polyethylene glycol having an average molecular weight $M_n$ of 1 500 and 80 g of water were heated to an internal temperature of about 85° C. under nitrogen. The additions were then commenced of a mixture of 192 g of vinylpyrrolidone, 128 g of vinylimidazole and 2.4 g of mercaptoethanol, added continuously over 4 h, and concurrently 2 g of 2,2'-azobis(2-methylpropionamidine) dihydrochloride (V-50, Wako Chemicals) in 50 g of water, added continuously over 5 h. Afterwards, the mixture was stirred at 85° C. for 1 hour. Following addition of 100 g of water and cooling to 60° C., 2.86 g of tert-butyl hydroperoxide were added. A start was also made on the 30 minute continuous addition of 2 g of sodium disulfite in 50 g of water. Afterwards, the mixture was stirred at 60° C. for 1 hour. It was then heated to 100° C. before a steam distillation was carried out (1 h). A solution was obtained which had a K value (in 3% by weight NaCl solution) of 21.9 and a solids content of 40% by weight.

Example 2

In a reactor equipped with nitrogen supply, reflux condenser, stirrer and metering means, 120 g of polyethylene glycol having an average molecular weight M, of 9 000 and 120 g of water were heated to an internal temperature of about 80° C. under nitrogen. The addition was then commenced of a mixture of 257.6 g of vinylpyrrolidone, 22.4 g of vinylimidazole and 2.8 g of mercaptoethanol. This was done by initially adding 5% by weight of this mixture all at once and the rest after 15 min continuously over 7 h. Concurrently with the first addition of this mixture, the continuous 7 hour addition of 3.5 g of tert-butylperpivalate in 60 g of isopropanol was commenced. On completion of this addition the mixture was stirred at 80° C. for a further 2 h. Subsequently, a further 1.4 g of tert-butyl perpivalate in 8 g of isopropanol were added before further mixing at 80° C. for 2 h. This last step was repeated 2 more times. The mixture was then heated to 100° C. before a steam distillation was carried out for 1 h. 410 g of water were added to obtain a solution having a K value of 28.2 and a solids content of 31.9% by weight.

Example 3

Example 2 was repeated, except that 80 g of the polyethylene glycol and 80 g of water, a mixture of 224 g of vinylpyrrolidone, 96 g of vinylimidazole and 3.2 g of mercaptoethanol and also 4 g of tert-butyl perpivalate in 60 g of isopropanol and a further 1.6 g of tert-butyl perpivalate in 8 g of isopropanol (repeated twice) were used. 100 g of water were added to obtain a solution having a K value of 31.4 and a solids content of 43.5% by weight.

Example 4

Example 2 was repeated, except that 80 g of a propylene oxide-ethylene oxide-propylene oxide triblock copolymer having an ethylene oxide content of 40 mol% and an average molecular weight $M_n$ of 2 800 and 80 g of water, a mixture of 224 g of vinylpyrrolidone, 96 g of vinylimidazole and 3.2 g of mercaptoethanol and also 4 g of tert-butyl perpivalate in 60 g of isopropanol and a further 1.6 g of tert-butyl perpivalate in 8 g of isopropanol (repeated twice) were used. In addition, 50 g of water were added following the first addition of tert-butyl perpivalate. This afforded a solution having a K value of 20.6 and a solids content of 50.2% by weight.

Example 5

Example 2 was repeated, except that 120 g of a polyethylene glycol having an average molecular weight $M_n$ of 1 500 and 120 g of water, a mixture of 140 g of vinylpyrrolidone, 140 g of vinylimidazole and 2.8 g of mercaptoethanol and also 3.5 g of tert-butyl perpivalate in 60 g of isopropanol and a further 1.4 g of tert-butyl perpivalate in 8 g of isopropanol (repeated twice) were used. This afforded a solution having a K value of 23.1 and a solids content of 41.9% by weight.

Example 6

Example 2 was repeated, except that 80 g of a polyethylene glycol having an average molecular weight M, of 600 and 80 g of water, a mixture of 160 g of vinylpyrrolidone, 160 g of vinylimidazole and 3.2 g of mercaptoethanol and also 4 g of tert-butyl perpivalate in 60 g of isopropanol and a further 1.6 g of tert-butyl perpivalate in 8 g of isopropanol (repeated twice) were used. In addition, 100 g of water were added following the first addition of tert-butyl perpivalate. 200 g of water were added to obtain a solution having a solids content of 32.3% by weight.

Example 7

Example 6 was repeated, except that 80 g of an ethylenediamine-ethylene oxide-propylene oxide block copolymer having an ethylene oxide content of 60 mol % and an average molecular weight $M_n$ of 6 000 were used. This afforded a solution having a K value of 24.3 and a solids contents of 41.5% by weight.

Example 8

Example 2 was repeated, except that 40 g of a polypropylene glycol having an average molecular weight $M_n$ of about 2 000 and 40 g of water, a mixture of 180 g of vinylpyrrolidone, 180 g of vinylimidazole and 3.6 g of mercaptoethanol and also 4.5 g of tert-butyl perpivalate in 60 g of isopropanol and a further 1.8 g of tert-butyl perpivalate in 8 g of isopropanol (repeated twice) were used. This afforded a solution having a K value of 23.5 and a solids content of 40.9% by weight.

Example 9

In a reactor equipped with nitrogen supply, reflux condenser, stirrer and metering means, 100 g of polyethylene glycol having an average molecular weight $M_n$ of 6 000 and 200 g of water were heated to an external temperature of about 100° C. (oil bath) under nitrogen. Thereafter, 95 g of N-vinylimidazole and 5 g of N-vinylpyrrolidone were added continuously over 4 h while concurrently 5 g of 2,2'-azobis (2-methylpropionamidine) dihydrochloride (V-50, Wako Chemicals) in 100 g of water were added continuously over 5 h. This was followed by slow cooling to 60° C. On attainment of this temperature (in the reactor) 0.7 g of tert-butyl hydroperoxide and 0.5 g of sodium disulfite in 20 g of water were added over 30 min. After cooling to room temperature, 134 g of dimethyl sulfate were added over 2 h while cooling with ice. After renewed heating to 70° C. for 2 h, the polymerization ended. A further 53 g of water were added to obtain a clear solution having a K value (in 0.5 molar NaCl solution) of 47.9 and a solids content of 50.0% by weight.

Example 10

Example 9 was repeated, except that 5 g of tert-butyl perpivalate in 100 g of isopropanol were used as free-radical initiator. Finally, 77 g of water were added to obtain a clear solution having a K value (in 0.5 molar NaCl solution) of 79.2 and a solids content of 45.7% by weight.

Example 11

In a reactor equipped with nitrogen supply, reflux condenser, stirrer and metering means, 100 g of polyethylene glycol having an average molecular weight $M_n$ of 1 500 and 200 g of water were heated to an external temperature of about 100° C. (oil bath) under nitrogen. Thereafter, 97 g of N-vinylimidazole and 3 g of N-vinylpyrrolidone were continuously added over 4 h, while concurrently 5 g of tert-butyl perpivalate in 100 g of isopropanol were added continuously over 5 h. After further stirring at that temperature for one hour, the mixture was cooled down to 75° C. On attainment of this temperature (in the reactor) 0.7 g of tert-butyl hydroperxide and 0.5 g of sodium disulfite in 20 g of water were added over 30 min. Following a steam distillation (500 g of distillate) the reaction mixture was maintained at 85° C. (externally) for a further 2 h. A further 20 g of water were added to obtain a clear solution having a K value (in 0.5 molar NaCl solution) of 22.4 and a solids content of 52.4% by weight.

Example 12

In a reactor equipped with nitrogen supply, reflux condenser, stirrer and metering means, 100 g of polyethylene glycol having an average molecular weight $M_n$ of 1 500 and 100 g of water were heated to an external temperature of about 100° C. (oil bath) under nitrogen. Thereafter, 90 g of N-vinylimidazole and 10 g of N-vinylpyrrolidone were added continuously over 4 h, while concurrently 5 g of 2,2'-azobis(2-methylbutyronitrile) (V-59, Wako Chemicals) in 100 g of isopropanol were added continuously over 5 h. Following addition of a further 0.5 g of 2,2'-azobis(2-methylbutyronitrile) the reaction mixture was stirred for a further 1 h. A steam distillation yielded 700 ml of distillate. Water was added to obtain a solution having a K value (in 0.5 molar NaCl solution) of 19.1 and a solids content of 29.6% by weight.

Example 13

In a reactor equipped with nitrogen supply, reflux condenser, stirrer and metering means, 130 g of diethyl sulfate were added over 2 h to 340.7 g of the product of example 11 under nitrogen. The mixture was then heated to 70° C. and stirred at that temperature for a further 2 h. This afforded a solution having a K value (in 0.5 molar NaCl solution) of 18.5 and a solids content of 43.6% by weight.

Example 14

In a reactor equipped with nitrogen supply, reflux condenser, stirrer and metering means, 124.6 g of benzyl chloride were added over 1.5 h to 340.7 g of the product of example 12 under nitrogen. The mixture was then heated to 70° C. and stirred at that temperature for a further 2 h. This afforded a solution having a K value (in 0.5 molar NaCl solution) of 21.5.

Example 15

In a reactor equipped with nitrogen supply, reflux condenser, stirrer and metering means, 80 g of a random 2-(2-butoxyethoxy)ethanol-ethylene oxide-propylene oxide copolymer (molar ratio 1:13:22) having an average molecular weight $M_n$ of 2 000 and 450 g of water were heated to an internal temperature of about 85° C. under nitrogen. Thereafter, a mixture of 192 g of vinylpyrrolidone and 128 g of vinylimidazole and, commencing 5 minutes later, a mixture of 6.4 g of 2,2'-azobis(2-methylpropionamidine) dihydrochloride (V-50, Wako Chemicals) and 50 g of water were each added continuously over 2 h. This was followed by stirring at 85° C. for a further 1 h. After cooling to an internal temperature of 60° C. initially 2.29 g of tert-butyl hyperoxide were added all at once, followed by 1.60 g of sodium disulfite in 50 g of water added continuously over 4.5 h. Following supplementary stirring at 60° C. for 1 hour, the reaction mixture was heated to 100° C. and subjected to a steam distillation (1h). This afforded a solution having a K value of 43.2 and a solids content of 31.6% by weight.

II) Testing of Graft Polymers According to the Invention as Dye Transfer Inhibitors in Laundry Detergents The graft polymers according to the invention were tested as dye transfer inhibitors in laundry detergents. To this end, a granular laundry detergent (LD 1) and two liquid laundry detergents (LD 2, and LD 3) were prepared by way of example in the composition recited in table 1, and they each contained 0.15% by weight of graft polymer. White cotton test cloth was then washed under the conditions mentioned in table 2 in the presence of dye which was added to the wash liquor as a 0.03 or 0.06% by weight aqueous solution.

The staining of the test cloth was measured photometrically using an Elrepho 2000 photometer from Datacolor. The reflectance (in %) was measured at the wavelength of the absorption peak of each of the various dyes. The whiteness of the test cloth after washing was used to evaluate the degree of staining. The measurements reported in tables 3a–c represent averages of multiple replications.

Tables 3a–c also recite the results of comparative wash trials carried out without dye transfer inhibitor (V1) or using as dye transfer inhibitor (V2) a graft polymer prepared similarly to example 2 of DE-A-100 36 713 using a polyethylene glycol having an average molecular weight $M_n$ of 9 000.

TABLE 1

Composition of laundry detergents (LD)

| Ingredients | LD 1 Amount in % by weight | LD 2 Amount in % by weight | LD 3 Amount in % by weight |
|---|---|---|---|
| $C_{12}/C_{14}$-fatty alcohol sulfate | | 27 | |
| $C_{12}/C_{14}$-fatty alcohol ethoxylate | | 7 | |
| Citric acid | | 2 | |
| $C_{12}/C_{14}$-alkylbenzenesulfonate | 9 | | 10 |
| $C_{13}/C_{15}$-tallow fatty alcohol converted with 7 EO | 6.6 | 6 | 12 |
| coconut fatty acid | | 5 | 11.4 |
| KOH | | | 1.7 |
| Borax | | 2.2 | 2.3 |
| Propylene glycol monomethyl ether | | 10 | |
| Ethanol | | | 2.0 |
| Soap | 1.8 | 1.4 | 3.4 |
| Zeolite A | 45 | | |
| Polycarboxylate (acrylic acid-maleic acid copolymer (w/w 70:30, $M_w$ 70 000) | 5 | | |
| Magnesium silicate | 0.8 | | |
| Sodium carbonate | 7.0 | | 2.3 |
| Trisodium citrate × 2 $H_2O$ | 12 | | 0.6 |
| Carboxymethylcellulose, sodium salt | 0.8 | | |
| Graft polymer (calc. 100%) | 0.15 | 0.15 | 0.15 |
| Water | ad 100 | ad 100 | ad 100 |

TABLE 2

Wash conditions

| | LD 1 | LDs 2 and 3 |
|---|---|---|
| Apparatus | Launder-O-meter | Launder-O-meter |
| Cycles | 1 | 1 |
| Duration | 30 min | 30 min |
| Water hardness | 3.0 mmol of $Ca^{2+}$/l, molar ratio Ca:Mg:$HCO_3$: 4:1:8 | 3.0 mmol of $Ca^{2+}$/l, molar ratio Ca:Mg:$HCO_3$: 4:1:8 |
| Temperature | 60° C. | 60° C. |
| Dye input | Dye solution | Dye solution |
| Test cloth | Cotton swatch | Cotton swatch |
| Liquid quantity | 250 ml | 250 ml |
| Liquor ratio | 12.5:1 | 12.5:1 |
| Detergent concentration | 4.5 g/l | 6 g/l |

TABLE 3A

LD 1 wash results

| Graft polymer of Ex. | % reflectance Direct Blue 71 | % reflectance Direct Red 212 | % reflectance Direct Black 22 |
|---|---|---|---|
| 1 | 76.9 | 65.4 | 71.0 |
| 2 | 63.4 | 57.1 | 64.8 |
| 3 | 69.4 | 62.2 | 69.3 |
| 4 | 68.8 | 61.7 | 68.0 |
| 5 | 72.9 | 61.3 | 70.6 |
| 6 | 74.9 | 64.7 | 71.6 |
| 7 | 75.5 | 65.1 | 71.8 |
| 8 | 77.2 | 65.9 | 71.7 |
| V1 (no addition) | 56.1 | 53.6 | 60.7 |
| V2 | 58.5 | 54.8 | 57.1 |
| Whiteness before wash | 79.8 | 78.8 | 80.0 |

TABLE 3B

LD2 wash results

| Graft polymer of Ex. | % reflectance Direct Blue 71 | % reflectance Direct Red 212 | % reflectance Direct Black 22 |
|---|---|---|---|
| 1 | 69.4 | 57.9 | 74.8 |
| 2 | 67.4 | 57.8 | 69.3 |
| 3 | 68.3 | 58.2 | 71.4 |
| 4 | 68.0 | 57.8 | 71.5 |
| V1 (no addition) | 57.0 | 54.2 | 68.0 |
| V2 | 58.4 | 54.2 | 67.1 |
| Whiteness before wash | 79.8 | 78.8 | 80.0 |

TABLE 3C

LD3 wash results 3

| Graft polymer of Ex. | % reflectance Direct Blue 71 | % reflectance Direct Red 212 | % reflectance Direct Black 22 |
|---|---|---|---|
| 5 | 78.8 | 71.0 | 77.9 |
| 6 | 76.5 | 68.6 | 76.8 |
| 7 | 77.0 | 69.4 | 76.1 |
| 8 | 77.9 | 71.2 | 76.4 |
| V1 (no addition) | 65.4 | 52.3 | 69.5 |
| V2 | 68.9 | 52.8 | 69.1 |
| Whiteness before wash | 79.8 | 78.8 | 80.0 |

The wash results obtained document the excellent effectiveness of the graft polymers according to the invention as dye transfer inhibitors, and this effectiveness is independent of the type of dye.

We claim:

1. Graft polymers comprising: (A) a polymeric polyether grafting base devoid of monoethylenically unsaturated units, and
   (B) polymeric side chains formed from copolymers of two different monoethylenically unsaturated monomers (B1) and (B2) which each comprises at least one nitrogenous heterocycle, wherein said side chains (B) account for 60 to 95% by weight of the total polymer;

wherein (B1) is a cyclic N-vinylamide of the formula I

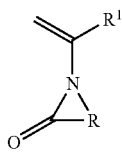

where
R is $C_1$–$C_5$-alkyl, and
$R^1$ is hydrogen or $C_1$–$C_4$-alkyl; and wherein said monomer (B2) contains a nitrogenous heterocycle selected from the group consisting of the pyrroles, pyrrolidines, pyridines, quinolines, isoquinolines, purines, pyrazoles, imidazoles, triazoles, tetrazoles, indolizines, pyridazines, pyrimidines, pyrazines, indoles, isoindoles, oxazoles, oxazolidones, oxazolidines, morpholines, piperazines, piperidines, isoxazoles, thiazoles, isothiazoles, indoxyls, isatins, dioxindoles and hydantoins and derivatives thereof, and barbituric acid and uracil and derivatives thereof.

2. Graft polymers as claimed in claim 1, wherein said monomer (B1) is N-vinylpyrrolidone.

3. Graft polymers as claimed in claim 1, wherein said monomer (B2) is selected from the group consisting of the N-vinylimidazoles, alkylvinylimidazoles, 3-vinylimidazole N-oxides, 2- and 4-vinylpyridines, 2- and 4-vinylpyridine N-oxides, N-vinylcaprolactams and N-vinyloxazolidones, and the betainic derivatives and quaternization products thereof.

4. Graft polymers as claimed in claim 1, wherein said monomer (B2) is a vinylimidazole of the formula IIa or IIb or a vinylpyridine of the formula IIc, IId, IIe or IIf

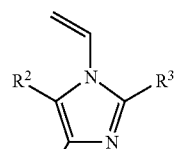

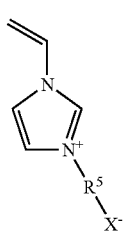

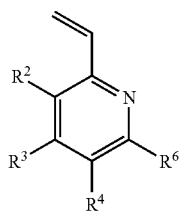

-continued

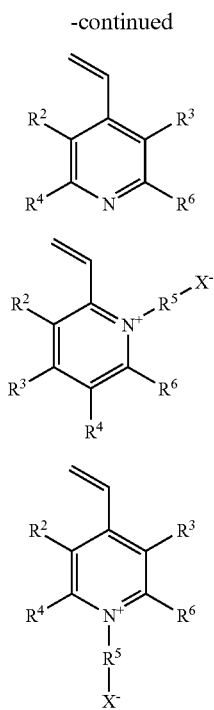

where
R², R³, R⁴ and R⁶ are each independently hydrogen, $C_1$–$C_4$-alkyl or phenyl,
R⁵ is $C_1$–$C_{20}$-alkylene,
X⁻ is $-SO_3^-$, $-OSO_3^-$, $-COO^-$, $-OPO(OH)O^-$, $-OPO(OR')O^-$ or $-PO(OH)O^-$ and
R' is $C_1$–$C_6$-alkyl.

5. Graft polymers as claimed in claim 1, wherein the weight ratio of said monomers (B1) and (B2) is in the range from 99:1 to 1:99.

6. Graft polymers as claimed in claim 1, wherein said grafting base (A) is a polyether having an average molecular weight $M_n$ of at least 300 and the formula IIIa or IIIb A is $-CO-O-$, $-CO-B-CO-O-$ or $-CO-NH-B-NH-CO-O-$,
B is $-(CH_2)_t-$ or substituted or unsubstituted arylene,
n is 1 or, when R⁷ is a polyalcohol radical, is from 1 to 8,
s is from 0 to 500,
t is from 1 to 12,
each u, which may be the same or different, is from 1 to 5,000,
each v, which may be the same or different, is from 0 to 5,000, and
each w, which may be the same or different, is from 0 to 5,000.

7. Graft polymers as claimed in claim 1, wherein said grafting base (A) is selected from the group consisting of polyalkylene oxides, singly capped polyalkylene oxides, afie doubly capped polyalkylene oxides, and mixtures thereof.

8. A process for preparing graft polymers as claimed in claim 1, which comprises:
free-radically polymerizing said monomers (B1) and (B2) in the presence of said grafting base (A).

9. A laundry detergent, comprising:
at least one graft copolymer as claimed in claim 1.

10. A method, which comprises:
mixing the laundry detergent of claim 9 with water and soaking fabric in the laundry detergent and water mixture.

11. The method as claimed in claim 10, wherein said side chains (B) account for 70 to 95% by weight of the total polymer.

12. The method as claimed in claim 10, wherein said side chains (B) account for 70 to 90% by weight of the total polymer.

13. The laundry detergent as claimed in claim 9, wherein said side chains (B) account for 70 to 95% by weight of the total polymer.

14. The laundry detergent as claimed in claim 9, wherein said side chains (B) account for 70 to 90% by weight of the total polymer.

15. A method, which comprises:
contacting at least one graft copolymer as claimed in claim 1 with fabric.

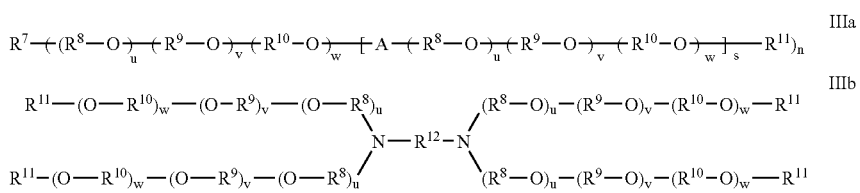

where independently
R⁷ is hydroxyl, amino, $C_1$–$C_{24}$-alkoxy, $R^{13}-COO-$, $R^{13}-NH-COO-$ or a polyalcohol radical,
R⁸, R⁹ and R¹⁰, which may be the same or different, are each $-(CH_2)_2-$, $-(CH_2)_3-$, $-(CH_2)_4-$, $-CH_2-CH(CH_3)-$, $-CH_2-CH(CH_2-CH_3)-$ or $-CH_2-CHOR^{14}-CH_2-$,
R¹¹ is hydrogen, amino-$C_1$–$C_6$-alkyl, $C_1$–$C_{24}$-alkyl, $R^{13}-CO-$ or $R^{13}-NH-CO-$,
R¹² is $C_1$–$C_{20}$-alkylene whose carbon chain may be interrupted by from 1 to 10 oxygen atoms in ether function,
R¹³ is $C_1$–$C_{24}$-alkyl,
R¹⁴ is hydrogen, $C_1$–$C_{24}$-alkyl or $R^{13}-CO-$, 16. The method as claimed in claim 15, wherein said side chains (B) account for 70 to 95% by weight of the total polymer.

17. The method as claimed in claim 15, wherein said side chains (B) account for 70 to 90% by weight of the total polymer.

18. Graft polymers as claimed in claim 1, wherein said side chains (B) account for 70 to 95% by weight of the total polymer.

19. Graft polymers as claimed in claim 1, wherein said side chains (B) account for 70 to 90% by weight of the total polymer.

* * * * *